US012263896B2

United States Patent
Stutzman et al.

(10) Patent No.: US 12,263,896 B2
(45) Date of Patent: Apr. 1, 2025

(54) MULTI-SELECTABLE APPLICATION MODE STEERING SYSTEM AND METHOD THEREOF

(71) Applicant: Deere & Company, Moline, IL (US)

(72) Inventors: Lowell D. Stutzman, Cedar Falls, IA (US); Nathanael K. Rehn, Waterloo, IA (US); Timothy J. Ofenloch, Willowbrook, IL (US); Jeffrey M. Tott, New Hartford, IA (US); Suresh Putta, Cedar Falls, IA (US); Douglas M. Van Meter, Grovetown, GA (US); Jordan L. Tagtow, Waterloo, IA (US); Jacyn R. Goebel, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 303 days.

(21) Appl. No.: 17/888,646

(22) Filed: Aug. 16, 2022

(65) Prior Publication Data
US 2023/0192182 A1    Jun. 22, 2023

Related U.S. Application Data

(60) Provisional application No. 63/290,333, filed on Dec. 16, 2021.

(51) Int. Cl.
*B62D 6/00* (2006.01)
*B62D 5/04* (2006.01)

(52) U.S. Cl.
CPC ........... *B62D 5/0478* (2013.01); *B62D 6/002* (2013.01); *B62D 6/008* (2013.01)

(58) Field of Classification Search
CPC ...... B62D 5/0478; B62D 6/002; B62D 6/008; B62D 5/091; B62D 6/007
See application file for complete search history.

(56) References Cited

U.S. PATENT DOCUMENTS 6,535,806 B2    3/2003 Millsap et al.
6,795,763 B2    9/2004 Yao et al.
(Continued)

FOREIGN PATENT DOCUMENTS

BR    102013023161 B1    7/2015
DE    102015114055 A1    3/2017
(Continued)

OTHER PUBLICATIONS

Matsuda Shigeru, May 18, 2007, English Machine Translation_ JP2008285037 provided by Patent Translate by EPO and Google (Year: 2007).*

(Continued)

*Primary Examiner* — Ashley L Redhead, Jr.
(74) *Attorney, Agent, or Firm* — Taft Stettinius & Hollister LLP; Stephen F. Rost

(57) ABSTRACT

A steering system for controlling a direction of travel of a work machine includes a steering device controllable by an operator of the work machine. The steering device is coupled to an axle of the work machine for controlling an angular orientation of the wheels. A brake is coupled to the steering device and is controllably applied to apply a first amount of resistance to the steering device. A motor is coupled to the steering device and is controllably activated to apply a second amount of resistance to the steering device. A controller controls the steering system of the work machine in at least a first operating mode and a second operating mode. In the first operating mode, the controller controls the brake between an applied position and an unapplied position, whereas in the second operating mode, the controller controls the motor between an active position and a de-activated position.

16 Claims, 4 Drawing Sheets

(56) References Cited

U.S. PATENT DOCUMENTS

| | | | |
|---|---|---|---|
| 7,233,850 | B2 | 6/2007 | Nakano et al. |
| 7,234,563 | B2 | 6/2007 | Ogawa et al. |
| 7,377,356 | B2 | 5/2008 | Turner et al. |
| 7,520,365 | B2 | 4/2009 | Fukuba et al. |
| 7,617,033 | B2 | 11/2009 | Katou |
| 7,686,124 | B2 | 3/2010 | Hublart et al. |
| 7,721,830 | B2 | 5/2010 | Dunn et al. |
| 7,908,056 | B2 | 3/2011 | Hwang |
| 8,249,777 | B2 | 8/2012 | Greul et al. |
| 8,321,090 | B2 | 11/2012 | Sakuma |
| 8,718,873 | B2 | 5/2014 | Kushiro |
| 9,050,999 | B2 | 6/2015 | Kuipers et al. |
| 9,205,867 | B2 | 12/2015 | Takeda |
| 9,393,992 | B2 | 7/2016 | Ognibene |
| 9,469,340 | B2 | 10/2016 | Morselli et al. |
| 9,592,848 | B1 | 3/2017 | Hirate et al. |
| 9,771,102 | B2 | 9/2017 | Sakurai |
| 9,809,248 | B2 | 11/2017 | Bauer et al. |
| 10,053,146 | B2 | 8/2018 | Morselli et al. |
| 10,589,775 | B2 | 3/2020 | Polmans et al. |
| 10,661,823 | B2 | 5/2020 | Delmarco et al. |
| 10,710,629 | B2 | 7/2020 | Morselli et al. |
| 10,807,637 | B2 | 10/2020 | Kodera |
| 10,953,916 | B2 | 3/2021 | Polmans |
| 11,541,862 | B2 | 1/2023 | Rehn et al. |
| 11,673,619 | B2 | 6/2023 | Hudson |
| 2008/0091319 | A1 | 4/2008 | Schick et al. |
| 2013/0158772 | A1 | 6/2013 | Swenson et al. |
| 2013/0311153 | A1* | 11/2013 | Moughler ............ G06Q 10/047 703/6 |
| 2015/0129252 | A1 | 5/2015 | Sudbrink et al. |
| 2019/0092377 | A1 | 3/2019 | Shin et al. |
| 2019/0217885 | A1 | 7/2019 | Figura et al. |
| 2020/0062241 | A1* | 2/2020 | Kelber .................. B60W 30/04 |
| 2020/0062292 | A1 | 2/2020 | Shin |
| 2020/0122770 | A1 | 4/2020 | Rasmussen |
| 2020/0189649 | A1 | 6/2020 | Polmans et al. |
| 2020/0216112 | A1 | 7/2020 | Emmert et al. |
| 2020/0231209 | A1 | 7/2020 | Walentowski |
| 2020/0247466 | A1 | 8/2020 | Eagles |
| 2020/0277003 | A1 | 9/2020 | Horvath |
| 2020/0339191 | A1 | 10/2020 | Polmans et al. |
| 2020/0346682 | A1 | 11/2020 | Forte et al. |
| 2020/0391789 | A1 | 12/2020 | Kim |
| 2020/0398891 | A1 | 12/2020 | Szepessy et al. |
| 2021/0001930 | A1 | 1/2021 | Ognibene |
| 2021/0008934 | A1 | 1/2021 | Buhrke |
| 2021/0024123 | A1 | 1/2021 | Vizer et al. |
| 2021/0029864 | A1 | 2/2021 | Pfaffmann et al. |
| 2021/0070361 | A1 | 3/2021 | Erickson et al. |
| 2021/0163061 | A1 | 6/2021 | Schemmel et al. |
| 2021/0171093 | A1* | 6/2021 | Wang ................... B62D 15/025 |
| 2022/0063581 | A1 | 3/2022 | Rehn et al. |
| 2022/0063722 | A1 | 3/2022 | Omikawa et al. |
| 2022/0319248 | A1 | 10/2022 | Sugo et al. |
| 2023/0192093 | A1 | 6/2023 | Stutzman et al. |
| 2023/0192182 | A1 | 6/2023 | Stutzman et al. |

FOREIGN PATENT DOCUMENTS

| | | | |
|---|---|---|---|
| EP | 1508494 A2 * | 2/2005 | ........... B62D 15/025 |
| EP | 3492344 A1 | 6/2019 | |
| JP | 2008285037 A * | 11/2008 | |
| WO | 2020152188 A1 | 7/2020 | |

OTHER PUBLICATIONS

Mueller Steffen, Aug. 19, 2003, English Machine Translation_ EP1508494A2 provided by Patent Translate by EPO and Google (Year: 2003).*

German Search Report issued in application No. 102022210458.7, dated Jul. 20, 2023, 6 pages.

New Holland T6000, https://agriculture.newholland.com/apac/en/equipment/products/agricultural-tractors/t6000/detail/faststeer-efficiency, printed Sep. 15, 2021, 3 pages.

New Holland T7: Steering to a new level of control and comfort, Press Release, Jul. 21, 2017, 4 pages.

Official Office Action, U.S. Appl. No. 17/888,656, filed Jul. 22, 2024, 21 pgs.

* cited by examiner

MULTI-SELECTABLE APPLICATION MODE STEERING SYSTEM AND METHOD THEREOF

RELATED APPLICATIONS

This application claims the benefit of U.S. Provisional Patent Application Ser. No. 63/290,333, filed Dec. 16, 2021, the disclosure of which is hereby incorporated by reference in its entirety.

FIELD OF THE DISCLOSURE

The present disclosure relates to a work machine, and in particular, to multi-selectable application mode steering system for controlling the work machine.

BACKGROUND

Off-road work machines encounter an extremely wide range of surface conditions during operation. In addition, many off road work machines carry heavy loads or pull heavy implements. Moreover, there are different tire options available which affect vehicle dynamics. For example, agricultural work machines often carry or pull heavy implements hitched to the rear of the vehicle. These large loads can often alter the steering characteristics of the machine. For example, when lightly loaded a machine may have a desirable and relatively stable "understeer" characteristic. But, when heavily loaded, the same machine may have an undesirable relatively unstable "oversteer" characteristic.

Moreover, operators of these work machines often want more control over the steering system. In particular, operators desire to feel an amount of feedback when steering the machine. Some operators prefer a more sensitive steering system where more feedback can be felt whereas other operators desire a less sensitive steering system.

It would be desirable to provide a work machine with a steering control system which is application specific and adjusts the sensitivity of the steering system and receives a desired feedback when controlling the machine.

SUMMARY

In one embodiment of the present disclosure, a steering system is provided for controlling a direction of travel of a work machine where the work machine includes an axle to which wheels are coupled. The steering system includes a steering device operably controllable by an operator of the work machine, the steering device configured to be operably coupled to the axle for controlling an angular orientation of the wheels; a brake operably coupled to the steering device, the brake being controllably applied to apply a first amount of resistance to the steering device; a motor operably coupled to the steering device, the motor being controllably activated to apply a second amount of resistance to the steering device; and a controller for controlling the steering system of the work machine, the controller being operably coupled with the brake and motor; wherein, the controller controls the steering system in at least a first operating mode and a second operating mode; wherein, in the first operating mode, the controller operably controls the brake between an applied position and an unapplied position; wherein, in the second operating mode, the controller operably controls the motor between an active position and a de-activated position.

In one aspect of this embodiment, the controller automatically selects between the at least first operating mode and the second operating mode based on predetermined criteria. In another aspect, the predetermined criteria includes at least one of travel speed of the work machine, operating status of the work machine, location of the work machine, and implement status. In a further aspect, the steering system includes a speed sensor in communication with the controller, the speed sensor configured to detect the travel speed of the work machine; wherein, the controller is configured to compare the travel speed of the work machine to a threshold speed, wherein, the controller controls the steering system in the first operating mode if the travel speed is less than the threshold speed, and the controller controls the steering system in the second operating mode if the travel speed is greater than the threshold speed.

In a different aspect, a power-take off system may perform a work task, the power-take off system is disposed in communication with the controller; wherein, the controller controls the steering system in the first operating mode when the power-take off system is performing the work task, and the controller controls the steering system in the second operating mode when the power-take off system is not performing the work task.

In a further aspect of this embodiment, a global positioning sensor may be disposed in electrical communication with the controller, such that the global positioning sensor is configured to detect a location of the work machine; wherein, the controller is configured to receive the location of the work machine from the global positioning sensor; wherein, if the location of the work machine is in a field, the controller controls the steering system in the first operating mode; wherein, if the location of the work machine is not in a field, the controller controls the steering system in the second operating mode.

In another aspect, the controller detects an operating status of an implement coupled to the work machine; wherein, if the operating status corresponds with the implement performing a work task, the controller controls the steering system in the first operating mode; wherein, if the operating status corresponds with the implement not performing a work task, the controller controls the steering system in the second operating mode. In yet another aspect, the steering device is directly coupled to the axle for controlling the angular orientation of the wheels. In a further aspect, the steering device is indirectly coupled to the axle in a steer-by-wire steering system. In yet a further aspect, a user control is disposed in electrical communication with the controller, the user control configured to be manually operated to select between the at least first operating mode and the second operating mode.

In another embodiment of the present disclosure, a steering control system is provided for controlling a steering system of a work machine, where the work machine includes a steering device and an axle to which wheels are coupled. In this embodiment, the steering control system includes a controller for controlling the steering system of the work machine; a steering device sensor disposed in communication with the controller, the steering device sensor configured to detect a movement of the steering device; a brake operably coupled to the steering device, the brake being controllably applied to apply a first amount of resistance to the steering device; a motor operably coupled to the steering device, the motor being controllably activated to apply a second amount of resistance to the steering device; and a valve assembly electrically coupled to the controller; and a double-acting cylinder configured to be operably coupled to the wheels, the double-acting cylinder disposed in fluid communication with the valve assembly; wherein, the controller controls the steering system in at least a first operating mode and a second operating mode; wherein, in the first operating mode, the controller operably controls the brake between an applied position and an unapplied position; wherein, in the second operating mode, the controller operably controls the motor between an active position and a de-activated position.

In one aspect of this embodiment, upon a movement of the steering device, the steering device sensor communicates the movement to the controller; the controller controls the valve assembly to actuate the cylinder to induce a change in angular orientation of the wheels. In another aspect, an angle sensor is electrically coupled to the controller, the angle sensor configured to detect the change in angular orientation of the wheels. In yet another aspect, the steering control system includes a user control disposed in communication with the controller, the user control configured to be manually adjustable to communicate to the controller an instruction to control the steering system in one of the at least first or second operating mode.

In a further aspect, the controller automatically selects between the at least first operating mode and the second operating mode based on predetermined criteria. In one aspect, the predetermined criteria may include at least one of travel speed of the work machine, operating status of the work machine, location of the work machine, and implement status. In another aspect, a speed sensor is in communication with the controller, the speed sensor configured to detect the travel speed of the work machine; wherein, the controller is configured to compare the travel speed of the work machine to a threshold speed; wherein, the controller controls the steering system in the first operating mode if the travel speed is less than the threshold speed, and the controller controls the steering system in the second operating mode if the travel speed is greater than the threshold speed.

In a different aspect, a power-take off system may be provided for performing a work task, where the power-take off system is disposed in communication with the controller; wherein, the controller controls the steering system in the first operating mode when the power-take off system is performing the work task, and the controller controls the steering system in the second operating mode when the power-take off system is not performing the work task. In some aspects, a global positioning sensor is disposed in electrical communication with the controller, the global positioning sensor configured to detect a location of the work machine; wherein, the controller is configured to receive the location of the work machine from the global positioning sensor; wherein, if the location of the work machine is in a field, the controller controls the steering system in the first operating mode; wherein, if the location of the work machine is not in a field, the controller controls the steering system in the second operating mode.

In another aspect, the controller detects an operating status of an implement coupled to the work machine; wherein, if the operating status corresponds with the implement performing a work task, the controller controls the steering system in the first operating mode; wherein, if the operating status corresponds with the implement not performing a work task, the controller controls the steering system in the second operating mode. In a further aspect, the steering device is directly coupled to the axle for controlling the angular orientation of the wheels. In yet a further aspect, the steering device is indirectly coupled to the axle in a steer-by-wire steering system.

In a further embodiment of the present disclosure, a method is provided for controlling a steering system of a work machine between at least a field mode and a transport mode, the work machine including a chassis and an axle to which wheels are coupled, the method comprising providing a steering device, a controller, a steering device sensor, a brake, and a motor; determining whether to control the steering system according to the field mode or transport mode; applying the brake to provide a first amount of resistance to the steering device if the controller is controlling the steering system according to the field mode; and engaging the motor to provide a second amount of resistance to the steering device if the controller is controlling the steering system according to the transport mode.

In one aspect of this embodiment, the method may include receiving a command from a user control to selectively control the steering system according to either the field mode or transport mode. In another aspect, the method may include automatically selectively controlling the steering system by the controller according to either the field mode or transport mode. In yet another aspect, the method may include detecting a travel speed of the work machine via a speed sensor; communicating the travel speed to the controller; comparing the travel speed to a threshold speed; and selecting the field mode if the travel speed is less than the threshold speed, and selecting the transport mode if the travel speed is greater than the threshold speed.

In a further aspect of this embodiment, the method may include controlling the steering system according to either the field mode or the transport mode; receiving a communication from the user control to switch from the field mode or transport mode to the other; and controlling the steering system according to the other of the field mode or transport mode. In yet a further aspect, the method may include receiving a signal from the steering device sensor indicative of a movement of the steering device; sending a command to a valve assembly via the controller to actuate a double-acting cylinder, the double-acting cylinder operably coupled to the wheels; and adjusting an angle of the wheels based on the movement of the steering device. In still a further aspect, the method may include controlling the angular movement of the wheels based only upon electrical communication from the controller.

In a different aspect of this embodiment, the method may include detecting an operating status of a power take-off system of the work machine; and controlling the steering system according to the field mode or transport mode based on the operating status of the power take-off system. In another aspect, the method may include receiving a location of the work machine via a global positioning sensor; determining if the location of the work machine is in a field; and controlling the steering system according to the field mode if the location is in determined to be in a field.

In a further aspect, the method may include determining if an implement is coupled to the work machine; if an implement is coupled to the work machine, controlling the steering system according to the field mode; and if an implement is not coupled to the work machine, controlling the steering system according to the transport mode. In yet a further aspect, the method may include determining an operating status of an implement coupled to the work machine; if the operating status is active, controlling the steering system according to the field mode; and if the operating status is inactive, controlling the steering system according to the transport mode.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
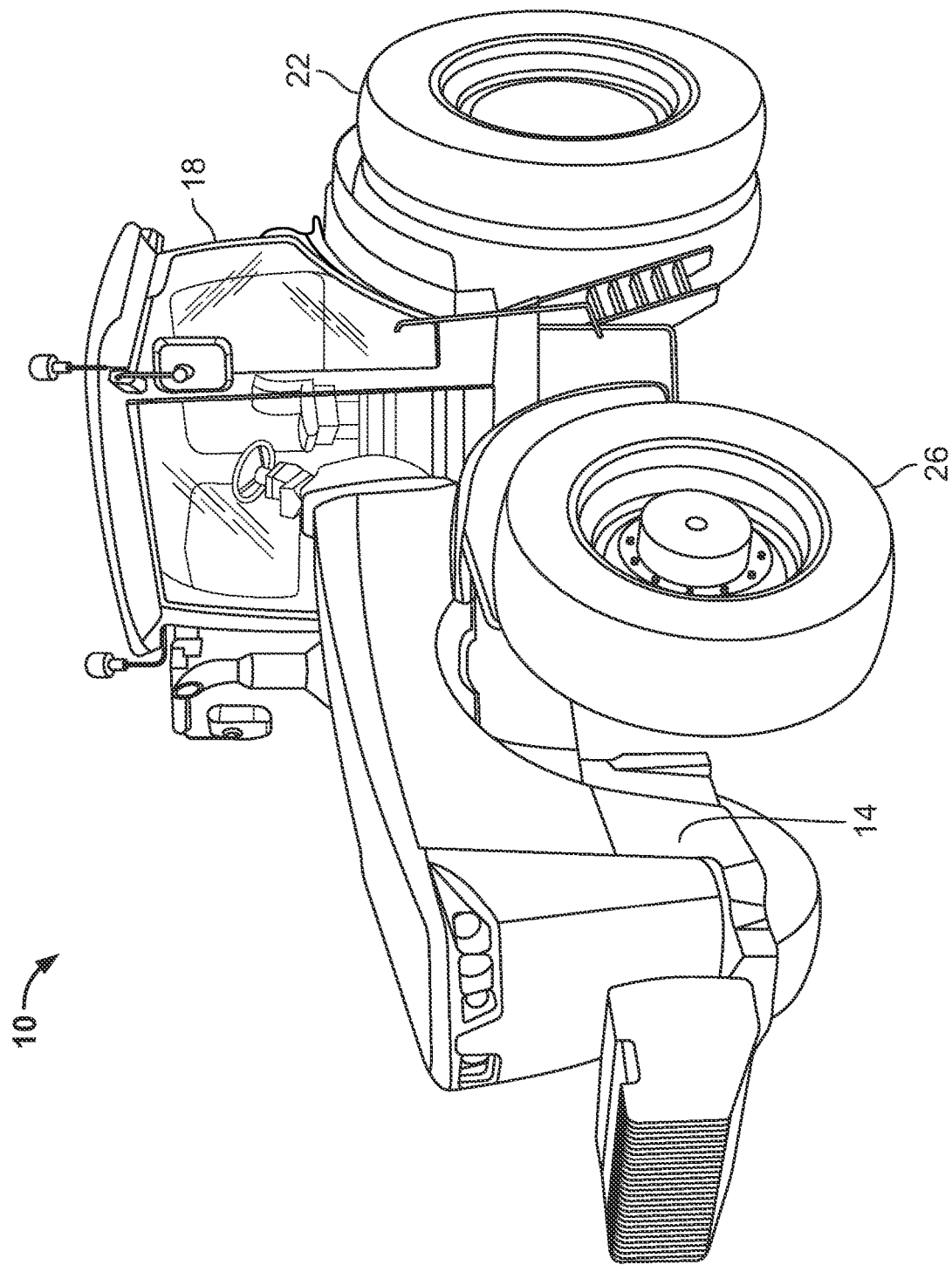
FIG. 1 is a side perspective view of a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Conventional steering systems, whether steer-by-wire or hydro-mechanical, can be designed to provide a certain amount of resistance against an operator input of a work machine as the work machine is performing a work function. However, these systems are often limited when the work machine is travelling at a higher travel speed such as during a transport function. When operating the machine in a transport mode or function, the steering system is unable to self-center or push back against operator inputs. As a result, it can require more effort from the operator to keep the work vehicle on a straight-line trajectory at higher transport speeds. An operator may therefore need to make periodic or frequent adjustments to the operator or user steering input (e.g., steering wheel) to maintain the straight-line trajectory. While these adjustments may be minor in magnitude, over time it can result in operator fatigue.

Referring to FIG. 1 of the present disclosure, an embodiment of a work machine 10, such as a tractor, is shown. In this embodiment, the work machine 10 may include a chassis 14, a cab 18, rear wheels 22, and front wheels 26. In some embodiments, either or both the rear wheels 22 and the front wheels 26 may be configured as tracks. The machine 10 may further include an engine (not shown) supported on the chassis 14. In one embodiment, the rear wheels 22 may be operably coupled to the engine (e.g., via a transmission) for providing power to the rear wheels. In other embodiments, the front wheels 26 or both the front wheels 26 and rear wheels 22 may be drivably coupled to the engine. In some embodiments, the front wheels 26 are powered and steered as part of a front steering system.

The cab 18 may include one or more operator or user controls for controlling the function of the work machine 10. The one or more controls may include a steering device such as a steering wheel, a range selector for operably controlling a transmission, a throttle or accelerator control for increasing power from the engine to the wheels, a brake for slowing the work machine, as well as other controls for controlling one or more work functions performed by the work machine. The cab 18 may include displays capable of displaying various information about the work machine 10. In some embodiments, the work machine 10 may include a hitch for towing an implement. Information about the implement may also be provided to the displays. In other embodiments, the cab 18 may include other controls, instrument panels or displays, etc. for controlling the work machine.

In other embodiments, the rear wheels may be powered and steered as part of a rear steering system for the forward propulsion of a work machine such as a combine, a self-propelled windrower, a self-propelled forage harvester, a cotton harvester, a sprayer or any other type of rear-wheel steer machine. The principles and teachings of the present disclosure may be applicable to a front-wheel steer machine or a rear-wheel steer machine.

In one embodiment of the present disclosure, a work machine steering system capable of steering the front wheels or rear wheels is provided which is capable of being controlled based on at least a first operating mode and a second operating mode. In some embodiments, the first operating mode may, for example, be a field or work mode. Here, the work machine may be performing a work function in a field when being operably controlled according to the first operating mode. This first operating mode may also be referred to as a field or feed lot application. In any event, when functioning according to the first operating mode, the steering system may use a brake for providing a light, passive non-directional torque along with vehicle speed-dependent steering ratios to decrease operator fatigue during long days of field or feed lot work. The brake may be actuated electronically, hydraulically, mechanically, pneumatically, or a combination thereof. In one embodiment, the brake may include a brake controller which operably controls brake function. In this embodiment, the brake controller may be operably controlled by a master controller such as a work machine or vehicle controller.

In some embodiments, the second operating mode may be, for example, a transport or non-work mode. In this second operating mode, the steering system may include a motor capable of providing a return-to-center force feedback to the operator steering device and fixed steering ratio to aid the operator in post-turn straightening of the front and/or rear wheels. Alternatively, in other embodiments, the steering system may operate according to a variable ratio steering while being controlled in the second operating mode. When operating in the second operating mode, the steering system may increase operator confidence while turning and driving at high speeds. In this system, the motor may be an electric motor, a hydraulic motor, or any other known type of motor. In one embodiment, the motor may include a motor controller which operably controls motor function. In this embodiment, the motor controller may be operably controlled by a master controller such as a work machine or vehicle controller.

The steering system of the present disclosure may be a hydro-mechanical or hydraulic steering system. One example of a hydro-mechanical or electrohydraulic system is disclosed in U.S. Publication Ser. No. 2020/0216112, assigned to Deere & Company, the contents of which are hereby incorporated by reference in their entirety. In at least one embodiment, a hydro-mechanical or hydraulic steering system may include a linkage between the operator steering device (e.g., steering wheel) and a valve assembly. If there is any perceived or actual inconsistency between the present application and U.S. Publication Ser. No. 2020/0216112, the present application controls.

Alternatively, the steering system of the present disclosure may be a steer-by-wire steering system. In one embodiment, a steer-by-wire steering system is a steering system in which there is no mechanical linkage between the operator steering device or input (e.g., steering wheel) and the front or rear axle. One example of a steer-by-wire steering system is disclosed in U.S. Publication Ser. No. 2008/0091319, assigned to Deere & Company, the contents of which are hereby incorporated by reference in their entirety. If there is any perceived or actual inconsistency between the present application and U.S. Publication Ser. No. 2008/0091319, the present application controls.

Figure 2:
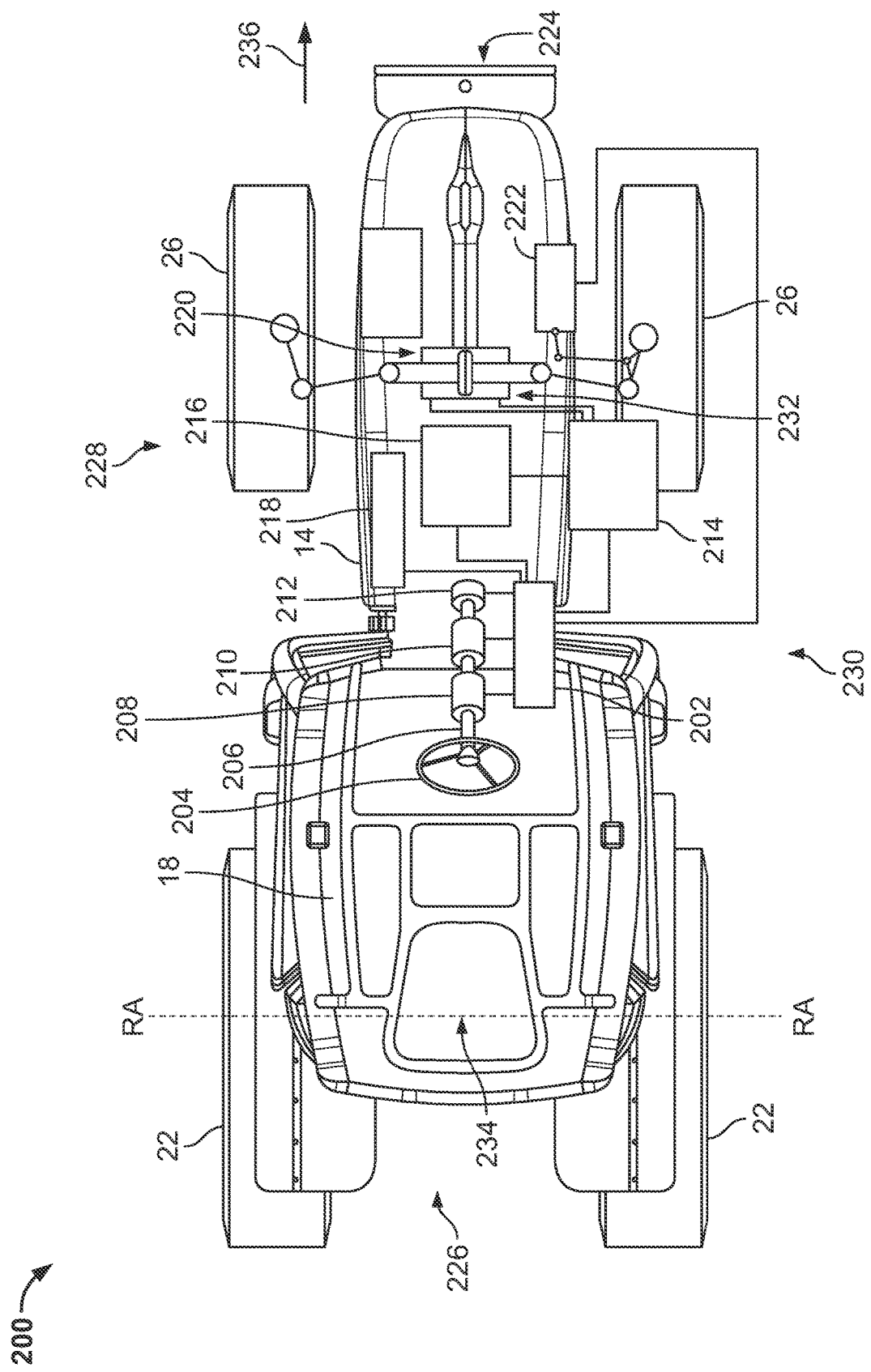
FIG. 2 is a schematic of a work machine with a steer-by-wire steering control system.

Referring to FIG. 2 of the present disclosure, one embodiment of a work machine 200 with a steer-by-wire steering system is illustrated. In this embodiment, the work machine 200 may be operably controlled by a machine controller 202. In one embodiment, the controller 202 is capable of controlling the machine and its operation. In another embodiment, the controller 202 is capable of controlling an engine which provides power for driving the machine. In a further embodiment, the controller 202 is capable of controlling a transmission which transfers power from the engine to the wheels. In yet a further embodiment, the controller 202 is capable of controlling the steering system of the work machine. In other embodiments, the controller 202 is capable of controlling an implement coupled to the work machine (e.g., being pulled or pushed). The controller 202 may be capable of controlling other features of the work machine 200.

In the illustrated embodiment of FIG. 2, the work machine 200 may include an operator steering device 204. The steering device 204 may include a steering wheel, joystick, or any other user-controllable component in place of the steering wheel such as a lever, yoke, pedal, and the like. The steering device 204 may be coupled to a steering column 206 as shown in the embodiment of FIG. 2.

In this embodiment, an operator may manipulate or otherwise control the steering device 204 by moving it for controlling a direction of travel 236 of the work machine 200. For example, the operator may turn or otherwise move the steering device 204 in one direction to induce a turning motion of the work vehicle in a first direction (e.g., a leftward direction). Alternatively, the operator may turn or otherwise move the steering device 204 in a second or opposite direction to induce a turning motion of the work vehicle in a second direction (e.g., a rightward direction).

In one embodiment, the steering device 204 may operably control an angular displacement or adjustment of the front wheels 26 which are disposed along a front axle 232. The front axle 232 is located towards a front end 224 of the work machine, whereas the rear wheels 22 are disposed along a rear axle 234 (aligned with axis RA) which is located towards a rear end 226 of the work machine 200.

In a steer-by-wire steering system such as the one depicted in FIG. 2, a steering device position sensor 212 may be arranged on or near a steering column 206 to which the steering device 204 is coupled. As the steering device 204 is moved, the position sensor 212 may detect the movement and communicate a signal to the controller 202 indicative of the movement. In turn, the controller 202 may electrically communicate with a steering valve assembly 214, as shown in FIG. 2. The steering valve assembly 214 may comprise one or more valves assemblies. The steering valve assembly 214 may be fluidly coupled to a hydraulic pump and reservoir. In one embodiment, the steering valve assembly 214 may include one or more solenoids which can be energized by current from the controller 202. By energizing or de-energizing the one or more solenoids, the steering valve assembly 214 communicate fluid to a double-acting steering cylinder 220 as shown in FIG. 2. The double-acting cylinder 220 may include a pair of ports which are fluidly coupled with the steering valve assembly 214.

In the embodiment of FIG. 2, the double-acting cylinder 220 may be hydraulically actuated to induce angular motion of the front wheels 26 for turning the work machine 200. The angle at which the wheels turn may be detected by a wheel angle sensor 222. A wheel angle sensor 222 may be disposed on or near a front wheel 26 on a first side 228 of the work machine 200, whereas a second wheel angle sensor 222 may be disposed on or near a front wheel 26 on a second side 230 of the work machine 200. In some embodiments, wheel angle sensors may be located on or near each of the rear wheels 22 for detecting their angular position as well.

The work machine 200 of FIG. 2 may include other sensors including a speed sensor 216 for detecting an operating speed of the work machine 200. A gyroscope 218 may also be provided for detecting an angular orientation or angular velocity of the work machine 200, particularly when operating on uneven terrain. Other sensors are also capable of being in electrical communication with the controller 202 for providing feedback to the controller 202 about one or more operating characteristics of the work machine.

In the illustrated embodiment, the steering system of FIG. 2 may also include a brake 208 and a motor 210. In this embodiment, the steering system is capable of being controlled in at least two different operating modes, similar to those described previously. In a first operating mode, the controller 202 may determine that the work machine is functioning in a work or field mode. Here, the controller 202 may operably control the brake 208 to provide a light, passive non-directional torque to the steering device 204 or column 206. In this first operating mode, the steering system may also provide vehicle-speed-dependent steering ratios to decrease operator fatigue when operating the machine in a work or field mode.

In a second operating mode, the controller 202 may determine that the work machine 200 is functioning in a transport or road mode where the operator may desire to travel at a higher speed than in the first operating mode. In one embodiment, the controller 202 may operably control the motor 210 to provide a force feedback to the steering device 204 or column 206. In this embodiment, the controller 202 may be programmed to monitor a position of the steering device 204 or column 206 via the position sensor 212. The controller 202 may detect if the position of the steering device 204 or column 206 satisfies a threshold position which is indicative of a substantially straight travel direction. In other words, the threshold position corresponds with the front and rear wheels being aligned so that the work machine travels in a substantially straight path. When the controller 202 determines the steering device 204 or column 206 have been moved by the operator away from the threshold position, the controller 202 may activate the motor 210 to apply a correctional torque to the device 204 or column 206 to bias it to return to the threshold position. In this embodiment, the motor 210 is capable of assisting the operator with post-turn straightening of the wheels and further increase operator confidence while turning and operating the machine at higher travel speeds.

Although the embodiment of FIG. 2 is representative of a steer-by-wire steering system, the teachings and principles of the present disclosure are not limited to this type of system. In another embodiment, a steering system similar to that of FIG. 2 may include a direct connection between the steering device 204 and the steering valve assembly 214. In one embodiment, this may be a hydraulic steering system. In another embodiment, the steering system may comprise a mechanical steering system. In a further embodiment, the steering system may include a hydro-mechanical steering system. In yet a further embodiment, the steering system may include an electrohydraulic steering system. In another embodiment, the steering system may include an electrical steering system with the capability of an electrically-actuated steering of one or more wheels on a work machine or vehicle. In other words, the fully electrical system may actuate one or more steered wheels with electrical actuation. Other embodiments of steering systems are within the scope of the present disclosure which include at least a steering device, a brake, and a motor and which is capable of being operably controlled in at least a first application or operating mode and a second application or operating mode.

Figure 3:
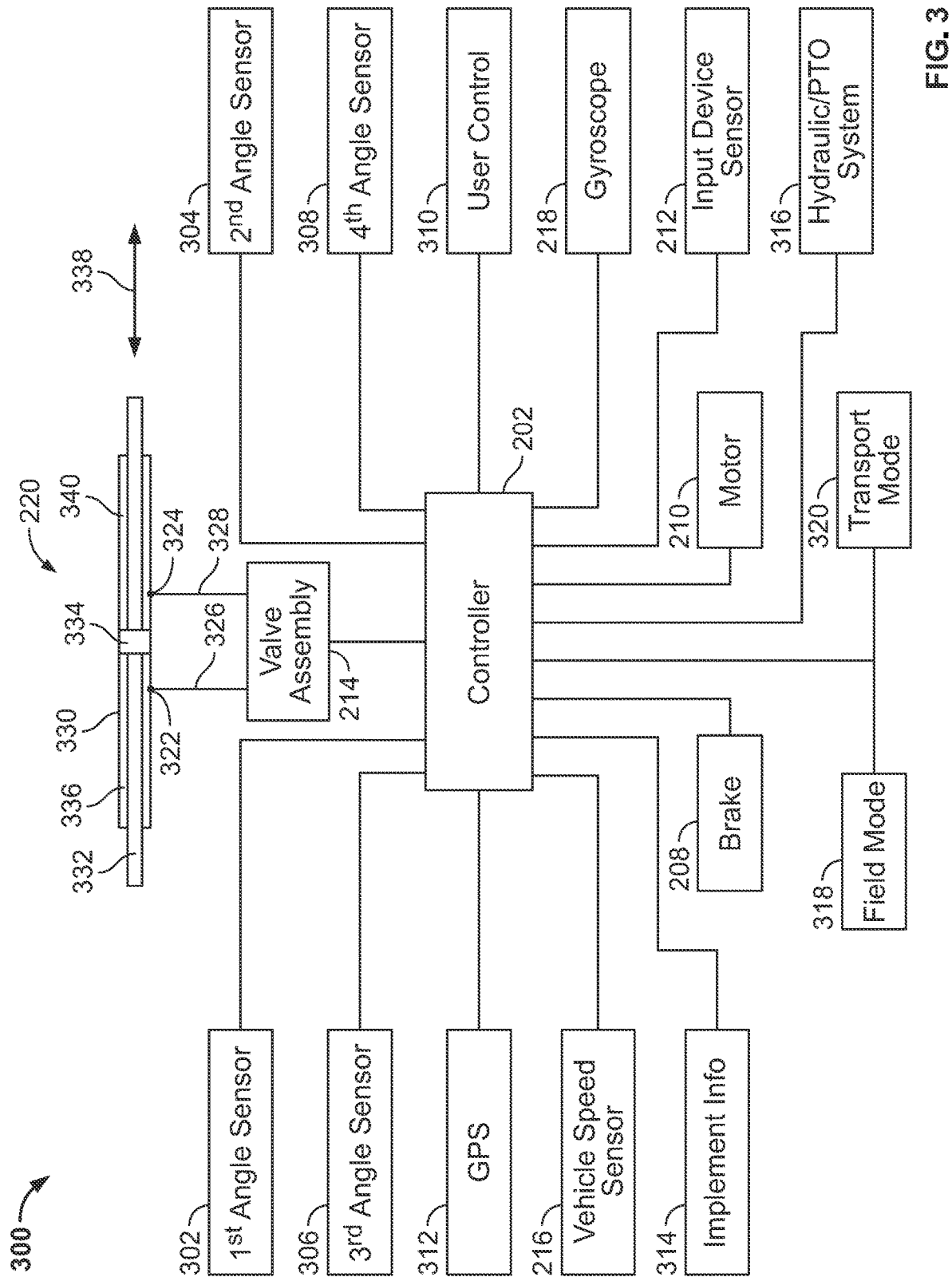
FIG. 3 is a schematic of a control system for controllably steering the work machine of FIGS. 1 and 2.

Turning now to FIG. 3 of the present disclosure, one embodiment of a control system 300 for controlling a steering system of a work machine is shown. In this embodiment, the control system 300 may include one or more of the structural features disclosed in FIG. 2 including a controller 202. The controller 202 may be capable of controlling the operation of the work machine as well as its steering system. The controller 202 may include at least a memory unit and processor, where the memory unit is capable of storing a set of instructions, algorithms, programs, look up tables, and other type of information for controlling the machine and steering system. The processor may be capable of executing the set of instructions, algorithms, programs, etc. which is stored by the memory unit.

In at least one embodiment, the controller 202 may be disposed in communication with the steering valve assembly 214. As previously described, the steering valve assembly 214 may include one or more valves which are actually controlled via a current signal from the controller 202. The steering valve assembly 214 may be fluidly coupled to a hydraulic pump and reservoir such that fluid is provided by the pump to the steering valve assembly 214. In some embodiments, the steering valve assembly 214 may be fluidly coupled to a double-acting steering cylinder or actuator 220, as shown in FIG. 3. The steering cylinder 220 may include a cylinder or barrel 330 through which an actuator 332 can be hydraulically moved in a direction indicated by arrow 338. In some embodiments, a piston 334 may be coupled to the actuator 332 such that it can divide the interior space of the cylinder or barrel 330 into a first end 336 and a second end 340.

In one embodiment, the first end 336 of the barrel 330 may be fluidly coupled to the steering valve assembly 214. As shown in FIG. 3, the barrel 330 may include a first port or inlet 322 located at the first end 336 thereof. Similarly, the barrel 330 may include a second port or inlet 324 located at the second end 340 thereof. The piston 334 may divide the two ends from one another. Fluid may enter the first port 322 via a first hydraulic line 326 coupled between the steering valve assembly 214 and the first port 322. Similarly, fluid may enter the second port 324 via a second hydraulic line 328 coupled between the steering valve assembly 214 and the second port 324.

In some embodiments, hydraulic fluid may be provided to either end of the barrel 330 to fluidly move the piston 334 in the direction within the barrel 330 towards the opposite end. In other words, hydraulic fluid that enters the first port 322 may hydraulically move the piston 334 towards the second end 340. As it does, hydraulic fluid in the second end 340 may return via the second port 324 to the valve assembly 214 and/or the reservoir (not shown). The same may be true when hydraulic fluid is provided to the cylinder 220 via the second port 324.

In some embodiments, the opposite ends of the actuator 332 may be coupled, either directly or via some other linkage or mechanism, to a pair of wheels of the work machine. As the actuator 332 is moved in either direction 338, its movement may induce an angular pivot of the wheels about their respective axle (i.e., front axle 232 or rear axle 234). As the wheels turn or pivot, a wheel angle sensor 222 may detect an angle by which the wheel turns. In FIG. 3, the control system 300 may include a first angle sensor 302, a second angle sensor 304, a third angle sensor 306, and a fourth angle sensor 308. Each angle sensor may be associated with a different wheel on the work machine. As shown in FIGS. 1-2, the work machine may include a pair of front wheels 26 and a pair of rear wheels 22. In this embodiment, an angle sensor may correspond to each of these wheels. In other embodiments, the work machine may include a plurality of wheels. In some of these embodiments, there may be an angle sensor for each of the plurality of wheels. In other embodiments, there may be an angle sensor for each wheel per axle. In yet other embodiments, the control system 300 may include a plurality of wheel angle sensors per wheel. In any event, the wheel angle sensors may be electrically coupled and in communication with the controller 202 for communicating a change in angle or detected angle of a wheel on the work machine.

The control system 300 of FIG. 3 may include other sensors or detection devices which are in communication with the controller 202. For example, in one embodiment, a machine or vehicle speed sensor 216 may be in communication with the controller 202. In another embodiment, a gyroscope 218 may be in communication with the controller 202. In yet a further embodiment, a global positioning sensor (GPS) 312 may be in communication with the controller 202. In one aspect, the memory unit of the controller 202 may include field maps where a certain work function may be performed. In another aspect, the memory unit of the controller 202 may include road maps where the work machine may commute during a transport mode. Information received from the GPS 312 about the work machine's location may be identified in a field map or road map via the controller 202. This information may allow the controller 202 to determine whether to operate the work machine steering system in accordance with one of a plurality of operating applications or modes.

The work machine may be capable of towing or pushing an implement. In some embodiments, the implement (not shown) may include an implement controller. The implement controller may communication implement information 314 to the controller 202. For sake of this disclosure, the implement information 314 may comprise a separate controller for controlling the implement and being in communication with the controller 202 to provide implement information. Other sources of implement information 314 may be provided to the controller 202 for helping control the steering system. This may include a RFID tag associated with the type, size, weight or function of implement coupled to the work machine.

In another embodiment, the work machine may include a hydraulic system or power take-off (PTO) system 316 for performing a work function. A sensing device or other communication mechanism may communicate if the hydraulic system or PTO system is active and performing a work task. The controller 202 may deduce from the hydraulic system or PTO system being active that the work machine is working in a field or otherwise performing a work function.

In the control system 300 of FIG. 3, the controller 202 may further include a set of instructions or algorithms for executing different modes of operation for controlling the steering system of the work machine. In one embodiment, one operating mode may include a field or work mode 318. The field or work mode 318 may be executed by the controller 202 when it is determined that the work machine is in a field or performing a work function. In this field mode, the controller 202 may activate the brake 208 in a manner previously described. Here, the brake 208 provides a light, passive non-directional torque which is designed to provide a low amount of resistance to turning the work machine. Instead, the brake 208 operates as a tactile feedback device and may apply a consistent amount of resistance or braking to the steering device 204.

In another embodiment, a second operating mode may include a transport or non-work mode 320. The transport or non-work mode 320 may be executed by the controller 202 when it is determined that the work machine is moving at a higher speed and is not performing a work function. In transport mode 320, the controller 202 may activate the motor 210 in a manner previously described. Here, the controller 202 is able to engage the motor 210 to provide a force feedback to the steering device 204 to aid in returning the steering device 204 back to a center or threshold position. In other words, the motor 210 actively provides resistance to the steering device 204 to bias it to its center or threshold position. The amount of resistance applied by the motor 210 can be a consistent or variable amount of resistance. For example, the controller 202 may determine the machine speed via the speed sensor 316 and road wheel angle via the angle sensors and compute a lateral acceleration of the work machine. Based on the lateral acceleration of the work machine, the controller 202 may operably control the motor 210 to output variable resistance to the steering device 204. Further, a fixed or variable steering ratio may also be provided to aid the operator in a post-turn straightening of the wheels and increase operator confidence while turning the machine and driving at higher speeds.

In some embodiments, the determination of which operating mode to select, e.g., the first or second operating modes in the embodiment of FIG. 3, can be made manually or automatically. For manual selection, a user control 310 may be located in the cab 18, for example, of the work machine where the operator can manually select which mode to operate in. With the manual selection, the controller 202 may receive a signal corresponding to the selection made by the operator, and in turn the controller 202 may operably control the steering system in accordance with the selected operating mode.

In another embodiment, a second user control 310 may be provided where an operator can adjust the amount of force feedback or resistance is output by the motor 210 to the steering device 204 in the transport mode 320. In one example, the second user control 310 may be a slider mechanism, knob, switch, lever, etc. In the same way, the user may adjust the non-directional torque output by the brake 208 in the field mode 318. In some embodiments, there may be a user control to adjust the output of the brake and a second user control for adjusting the output of the motor. In one aspect, the user control may be a dial, switch, lever, joystick, knob, or the like.

In other embodiments, the selection of operating mode (e.g., field mode or transport mode) may be executed automatically via the controller 202. In one embodiment, the controller 202 may detect the traveling speed of the work machine via the speed sensor 216 and compare it to a threshold speed. If the current travel speed is greater than the threshold speed, the controller 202 may select transport mode 320. If the speed is less than the threshold speed, then the controller 202 may select field mode 318.

In another embodiment, the controller 202 may evaluate the location of the work machine via its GPS location as received from GPS 312. The controller 202 may identify the location of the machine on a field map or road map, and if the work machine is located in a field then the controller 202 may select field mode 318. Alternatively, if the controller 202 determines that the work machine is travelling on a road or highway, then the controller 202 may select transport mode 320 for controlling the steering system.

In a further embodiment, the controller 202 may evaluate the current operation of the work machine. Here, the controller 202 may receive an input from the hydraulic/PTO system 316. Based on the input, the controller 202 may select field mode 318 if the input corresponds to an active system 316 or transport mode 320 if the input corresponds to an inactive system 316.

In yet a further embodiment, the controller 202 may receive implement information 314 from an implement controller, for example, or other source. In some embodiments, the operator may input implement information 314 via a user control 310. In any event, the controller 202 may determine based on the implement information 314 whether to operate in field mode 318 or transport mode 320. For instance, if the implement is actively performing a work function and this is communicated in the implement information 314, then the controller 202 may select field mode 318. In another aspect, if the implement is large or has a significant weight, then the controller 202 may select field mode 318. Alternatively, if the controller 202 determines that no implement is coupled to the work machine via the implement information 314, then the controller 202 may select transport mode 320. Other variations or determinations may be made by the controller 202 to determine whether to operate the steering system in field mode, transport mode, or any other mode.

In one embodiment, the controller 202 may continuously monitor one or more of the aforementioned characteristics (e.g., speed, location, operation, implement information, etc.) and switch between one or more modes as these characteristics change. Alternatively, the operator may manually switch between one or more of these operating modes. In one embodiment, the controller 202 may be programmed to control the steering system in accordance with the operating mode manually selected by the operator. In another embodiment, the controller 202 may be programmed to override a manual selection made by the operator in the event the manual selection may be undesirable to the work machine or its steering system. In this event, the controller 202 may send a message via a display in the cab 18 to the operator indicating the override and reason therefore. This may prevent an unintentional selection of an operating mode.

In the present disclosure, a control method or process 400 may be executed by the controller 202 to determine which of a plurality of operating modes to control the steering system. In the illustrated embodiment, and for sake of brevity, the steering system of a work machine may operate in a first operating mode and a second operating mode. The first operating mode may correspond with a field mode 318 and the second operating mode may correspond with a transport mode 320, as described above with respect to FIG. 3. In other embodiments, the controller 202 may select between three or more operating modes. Each operating mode may correspond to the different functionality and operation of the work machine or implement.

Figure 4:
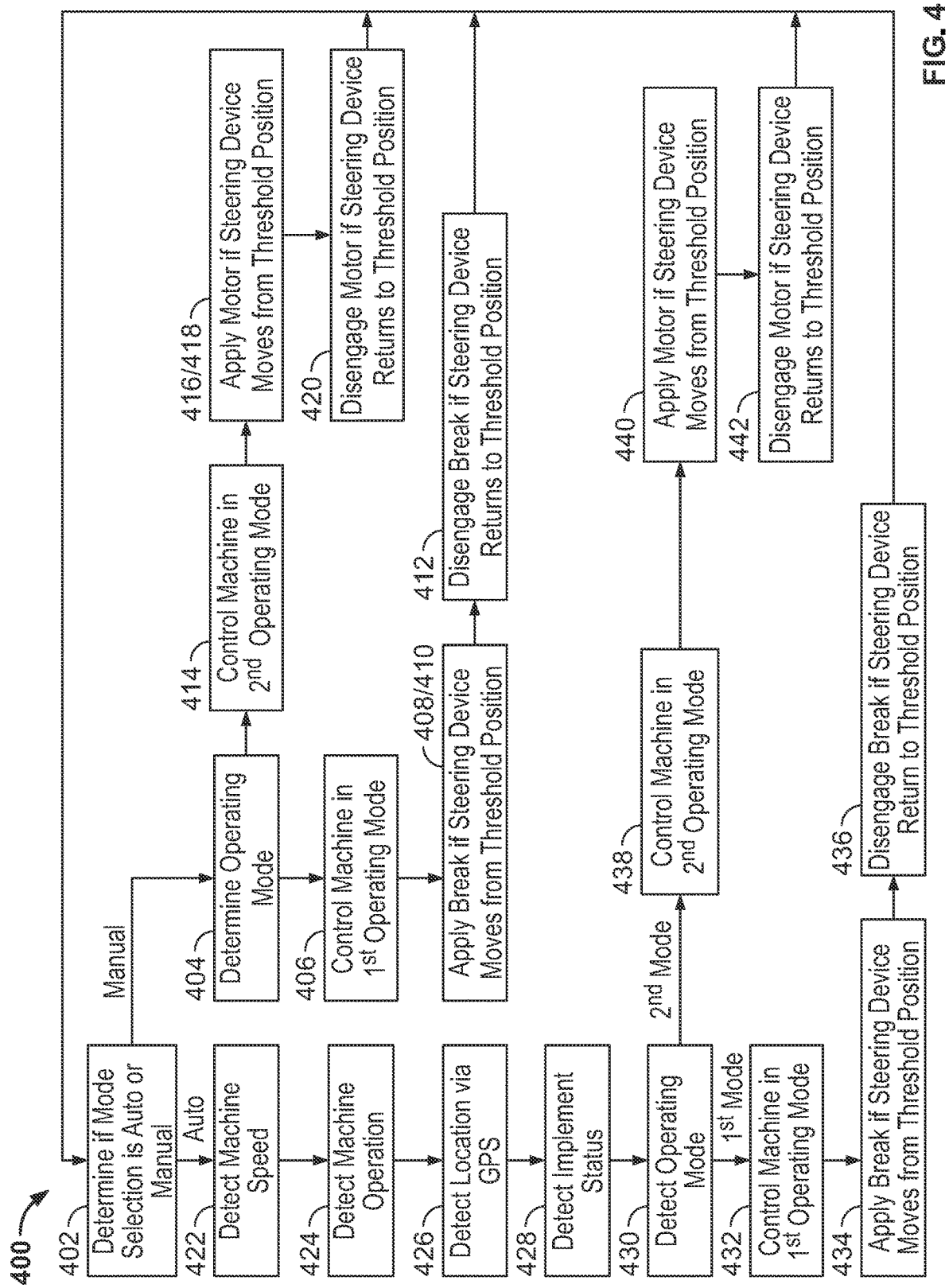
FIG. 4 is a flow diagram of a method for selecting an application mode and controllably steering a work machine.

In the control method 400 of FIG. 4, the controller 202 may include an algorithm, set of instructions, software, logic, and the like to execute the method 400. The method 400 may include a plurality of steps or blocks to be executed by the controller 202. In one embodiment, each block or step may be executed in the order as shown in FIG. 4. In another embodiment, each block or step may be executed in a different order than shown in FIG. 4. In a further embodiment, additional blocks or steps may be executed by the controller. Other embodiments may include fewer blocks or steps to be executed.

Referring to the illustrated embodiment of FIG. 4, a first block 402 may be executed by the controller 202 to determine if mode selection is manual or automatic. A user control or switch in the cab may be controlled by the operator of the work machine to select either manual or automatic mode selection. In the event mode selection is manual, then the control method 400 may advance to block 404. If, however, mode selection is automatic, then the control method 400 may advance to block 422.

In block 404, the controller 202 can determine if the operator or user control 310 is selecting the first operating mode or the second operating mode. If the user control 310 corresponds with the first operating mode, then the control method 400 may advance to block 406. If, however, the user control 310 corresponds with the second operating mode, then the control method 400 may advance to block 414.

In some embodiments, if the method 400 advances to block 406, the controller 202 may actively control the steering system of the work machine in accordance with the first operating mode. Here, this may correspond with the field mode. In the first operating mode, the controller 202 may detect in block 408 if the steering device 204 moves from a threshold position. The threshold position may correspond with a center position or a position in which the wheels of the work machine are oriented to move the work machine in a substantially straight travel direction. When the work machine is travelling in a substantially straight path, the steering device 204 may be in the threshold position (or a range). As the operator maneuvers the steering device 204 to make a turning motion, the steering device 204 may move outside the threshold position. As it does, the control method 400 may advance to block 410 where the controller 202 activates the brake 208. The brake 208 may be activated in block 410 to provide a low resistance non-directional torque to the steering device 204 until the steering device returns to the threshold position. This, for example, may be detected in block 412. If the steering device 204 returns to the threshold position, the controller 202 may deactivate the brake 208.

In a different embodiment, the controller 202 may activate the brake 208 once the user control selects the first operating mode. The brake 208 may remain active and providing the resistance so long as the first operating mode is selected. When another operating mode is selected, the controller 202 may disengage the brake 208 in this embodiment.

Regardless of the embodiment, the controller 202 may continuously perform block 402 in the event the operator changes the mode selection between the automatic and manual mode selection.

If, in block 404, the operator selects the second operating mode associated with a transport mode, the method 400 may advance to block 414. Here, the controller 202 may actively control the steering system according to the second operating mode. As it does so, the controller 202 may monitor the steering device 204. In block 416, the controller 202 may detect movement of the steering device 204 from the threshold position (or range). If the steering device 204 is moved out of the threshold position or range, the control method 400 may advance to block 418 where the controller activates the motor 210. Here, in this embodiment, the motor 210 may apply a feedback force to the steering device 204 as to bias it back to the threshold position. The amount of feedback force or resistance applied by the motor 210 to the steering device 204 may be such that the operator can easily overcome it in an effort to control the steering device 204. However, when the operator is no longer moving the steering device 204, the resistance from the motor 210 may be felt by the operator in an effort to re-center or re-position the steering device 204 back to its threshold position.

In some embodiments, the controller 202 may engage the motor 210 as soon as the user control 310 selects the second operating mode. In these embodiments, the motor 210 may be actively providing resistance to the steering device 204 on a continuous basis. In other embodiments, the motor 210 may only be activated when the controller 202 receives a communication from the steering device sensor 212 that the steering device 204 has moved outside of the threshold position. In some embodiments, once the steering device 204 returns to its threshold position or range, the controller 202 may deactivate the motor 210. In any event, whether the motor 210 is active or not, the controller 202 may continuously execute block 402 where it detects if the selection mode is automatic or manual. Further, the controller 202 may also continuously perform block 404, if the selection mode is manual, to determine if the operator has switched between any two of the operating modes.

In another embodiment, the controller 202 may determine in block 402 that the selection mode is set to automatic or the steering system is setup to be automatically controlled by the controller. In this embodiment, the controller 202 may execute the method 400 by advancing to blocks 422-430 where the controller 202 may perform one or more evaluations in order to determine whether to control the steering system according to the first or second operating mode. In other embodiments where there are three or more operating modes, the controller 202 may perform one or more of these evaluations to select one of the three or more operating modes by which it controls the steering system.

In one embodiment, the controller 202 may execute block 422 where it detects or receives a work machine speed. The controller 202 may calculate speed in accordance with any conventional calculation, or it may receive the speed from the speed sensor 216.

In another embodiment, the controller 202 may execute block 424 where the controller 202 detects the operating state of the machine. In one aspect, the controller 202 may detect a status of a hydraulic system. In another aspect, the controller 202 may detect a status of a PTO system. Other systems may provide inputs to the controller 202 to allow it to determine the operating status of the work machine in block 424.

In a further embodiment, the controller 202 may execute block 426 by determining a location of the work machine via GPS 312. The location may correspond with a field where the work machine is performing a work function. Alternatively, the location may correspond with a roadway where the work machine is travelling to a new destination. The controller 202 may compare the location to a field map, road map, or any type of map in order to determine the location of the work machine.

In another embodiment, the controller 202 may execute block 428 in order to determine a status of an implement. If an implement is coupled to the work machine, the controller 202 may receive information about the implement including its current operation status (i.e., whether it is running or not), its weight, size, etc. If no implement is coupled to the work machine, the controller 202 may receive this information as well.

In other embodiments, the controller 202 may perform additional evaluations to better determine which operating mode the steering system should be controlled in. For example, if any diagnostic or trouble-shooting code is triggered and received by the controller, the controller may evaluate if one operating mode is better than another.

In the illustrated embodiment of FIG. 4, the control method 400 may advance to block 430 where the controller 202 is able to use its evaluations from blocks 422-428 and determine which operating mode to select. The evaluations made in blocks 422-428 may be compared to predetermined thresholds or criteria for operating the steering system. For example, the controller 202 may compare the machine speed to a speed threshold in block 430. If the machine speed is less than the threshold, the controller 202 may select the first operating mode. If the machine speed is greater than the threshold, the controller 202 may select the second operating mode.

In another embodiment, the controller 202 may determine the operating status of the work machine. If it is determined the hydraulic system or PTO system 316 are operational and performing a work task, the controller 202 may select the first operating mode. If, however, these systems are not operational, then the controller 202 may select the second operating mode.

In a further embodiment, in block 430, the controller 202 may determine from GPS 312 that the work machine is operating in a field. In this case, the controller 202 may select the first operating mode. If the controller 202 determines the work machine is not in a field, it may select the second operating mode.

In yet another embodiment, the controller 202 may determine in block 430 information about an implement coupled to the work machine. If the implement is operating, the controller 202 may determine the steering system is best operated in the first operating mode. Moreover, even if the implement is not performing a work task but weighs a certain amount, the controller 202 may determine to operate according to the first operating mode. In other aspects, however, the controller may determine there is no implement coupled to the work machine and thus the steering system may be controlled via the second operating mode.

In any event, the controller 202 may perform one or more evaluations in block 430 and determine which operating mode to select. If the first operating mode is selected in block 430, the method 400 may advance to block 432. If, however, the second operating mode is selected, the method 400 may advance to block 438.

In one embodiment, the method 400 may advance to block 432 such that the controller 202 controls the steering system in accordance with the first operating mode. In doing so, the controller 202 may engage the brake 208 to apply a resistance to the steering device 204. The resistance may be applied as long as the first operating mode is selected. In an alternative aspect, the resistance from the brake 208 may be applied when the steering device 204 is moved away from its threshold position. In this example, the controller 202 may execute block 434 where it receives information from the sensor 212 that the steering device 204 is moved from its threshold position. In this example, the brake 208 may be released when the steering device 204 returns to its threshold position in block 436.

Whether the brake is engaged or not in the first operating mode, the controller 202 may continuously execute block 402 to determine if the selection mode is switched from automatic to manual.

In another embodiment, the controller 202 may execute block 430 and select the second operating mode. In doing so, the controller 202 may control the steering system of the work machine according to the second or transport operating mode. Here, the controller 202 may receive communications from the steering device sensor 212 and evaluate if the steering device 204 is moved from its threshold position. In block 440, if the steering device 204 is moved from the threshold position, the controller 202 may activate the motor 210 to apply a force feedback or resistance to the steering device 204 in an attempt to return it to the threshold position or range. In this manner, the motor 210 may function as a biasing mechanism with the intent of returning the steering device (e.g., steering wheel) to its threshold or center position. In block 442, if the steering device 204 returns to its threshold position, the controller 202 may disengage the motor such that the resistance is unapplied. Whether the motor 210 is engaged or not in the second operating mode, the controller 202 may continuously execute block 402 to determine if the selection mode is switched from automatic to manual.

In the automatic setting or selection mode, the controller 202 may also continuously execute one or more of blocks 422-430. In doing so, the controller 202 may automatically switch between operating modes as conditions or circumstances change. The controller 202 may communicate the current operating status to a user interface in the cab. Moreover, the controller 202 may communicate when it is switching to a different operating mode to the user interface. Further, the controller 202 may display on the user interface if the mode selection is automatic or manual so that an operator is continuously made aware of the current mode selection.

It is also within the scope of the present disclosure that the controller 202 can execute the method 400 of FIG. 4 with a steer-by-wire steering system or other type including, but not limited to, a mechanical system, an electrohydraulic system, a hydraulic system, a hydro-mechanical system, an electrical system, and the like.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A steering system for controlling a direction of travel of a work machine, the work machine including an axle to which wheels are coupled, the steering system comprising:
   a steering device operably controllable by an operator of the work machine, the steering device configured to be operably coupled to the axle for controlling an angular orientation of the wheels;
   a brake operably coupled to the steering device, the brake being controllably applied to apply a first amount of resistance to the steering device;

a motor operably coupled to the steering device, the motor being controllably activated to apply a second amount of resistance to the steering device; and a controller for controlling the steering system of the work machine, the controller being operably coupled with the brake and motor;

wherein, the controller controls the steering system in at least a first operating mode and a second operating mode;

wherein, in the first operating mode, the controller operably controls the brake between an applied condition and an unapplied condition;

wherein, in the second operating mode, the controller operably controls the motor between an active condition and a de-activated condition, where in the active condition the motor applies the second amount of resistance;

wherein the controller automatically selects between the at least first operating mode and the second operating mode based on predetermined criteria; and wherein the predetermined criteria include at least one of travel speed of the work machine, operating status of the work machine, location of the work machine, and implement status.

2. The steering system of claim 1, further comprising a speed sensor in communication with the controller, the speed sensor configured to detect the travel speed of the work machine;

wherein, the controller is configured to compare the travel speed of the work machine to a threshold speed;

wherein, the controller controls the steering system in the first operating mode if the travel speed is less than the threshold speed, and the controller controls the steering system in the second operating mode if the travel speed is greater than the threshold speed.

3. The steering system of claim 1, further comprising a power-take off system for performing a work task, the power-take off system disposed in communication with the controller;

wherein, the controller controls the steering system in the first operating mode when the power-take off system is performing the work task, and the controller controls the steering system in the second operating mode when the power-take off system is not performing the work task.

4. The steering system of claim 1, further comprising a global positioning sensor disposed in electrical communication with the controller, the global positioning sensor configured to detect a location of the work machine;

wherein, the controller is configured to receive the location of the work machine from the global positioning sensor;

wherein, if the location of the work machine is in a field, the controller controls the steering system in the first operating mode;

wherein, if the location of the work machine is not in a field, the controller controls the steering system in the second operating mode.

5. The steering system of claim 1, wherein the controller detects an operating status of an implement coupled to the work machine;

wherein, if the operating status corresponds with the implement performing a work task, the controller controls the steering system in the first operating mode;

wherein, if the operating status corresponds with the implement not performing a work task, the controller controls the steering system in the second operating mode.

6. The steering system of claim 1, wherein the steering device is directly coupled to the axle for controlling the angular orientation of the wheels.

7. The steering system of claim 1, wherein the steering device is indirectly coupled to the axle in a steer-by-wire steering system.

8. A steering control system for controlling a steering system of a work machine, the work machine including a steering device and an axle to which wheels are coupled, the steering control system comprising:

a controller for controlling the steering system of the work machine;

a steering device sensor disposed in communication with the controller, the steering device sensor configured to detect a movement of the steering device;

a brake operably coupled to the steering device, the brake being controllably applied to apply a first amount of resistance to the steering device;

a motor operably coupled to the steering device, the motor being controllably activated to apply a second amount of resistance to the steering device; and a valve assembly electrically coupled to the controller; and a double-acting cylinder configured to be operably coupled to the wheels, the double-acting cylinder disposed in fluid communication with the valve assembly;

wherein, the controller controls the steering system in at least a first operating mode and a second operating mode;

wherein, in the first operating mode, the controller operably controls the brake between an applied condition and an unapplied condition;

wherein, in the second operating mode, the controller operably controls the motor between an active condition and a de-activated condition, where in the active condition the motor applies the second amount of resistance;

wherein the controller automatically selects between the at least first operating mode and the second operating mode based on predetermined criteria; and wherein the predetermined criteria include at least one of travel speed of the work machine, operating status of the work machine, location of the work machine, and implement status.

9. The steering control system of claim 8, wherein:

upon a movement of the steering device, the steering device sensor communicates the movement to the controller;

the controller controls the valve assembly to actuate the cylinder to induce a change in angular orientation of the wheels.

10. The steering control system of claim 9, further comprising an angle sensor electrically coupled to the controller, the angle sensor configured to detect the change in angular orientation of the wheels.

11. The steering control system of claim 8, further comprising a speed sensor in communication with the controller, the speed sensor configured to detect the travel speed of the work machine;

wherein, the controller is configured to compare the travel speed of the work machine to a threshold speed;

wherein, the controller controls the steering system in the first operating mode if the travel speed is less than the threshold speed, and the controller controls the steering system in the second operating mode if the travel speed is greater than the threshold speed.

12. The steering control system of claim 8, further comprising a power-take off system for performing a work task, the power-take off system disposed in communication with the controller;
   wherein, the controller controls the steering system in the first operating mode when the power-take off system is performing the work task, and the controller controls the steering system in the second operating mode when the power-take off system is not performing the work task.

13. The steering control system of claim 8, further comprising a global positioning sensor disposed in electrical communication with the controller, the global positioning sensor configured to detect a location of the work machine;
   wherein, the controller is configured to receive the location of the work machine from the global positioning sensor;
   wherein, if the location of the work machine is in a field, the controller controls the steering system in the first operating mode;
   wherein, if the location of the work machine is not in a field, the controller controls the steering system in the second operating mode.

14. The steering control system of claim 8, wherein the controller detects an operating status of an implement coupled to the work machine;
   wherein, if the operating status corresponds with the implement performing a work task, the controller controls the steering system in the first operating mode;
   wherein, if the operating status corresponds with the implement not performing a work task, the controller controls the steering system in the second operating mode.

15. The steering control system of claim 8, wherein the steering device is directly coupled to the axle for controlling the angular orientation of the wheels.

16. The steering control system of claim 8, wherein the steering device is indirectly coupled to the axle in a steer-by-wire steering system.

* * * * *